March 11, 1924.
H. J. ATTICKS ET AL
1,486,316
COUPLING
Filed April 26, 1922
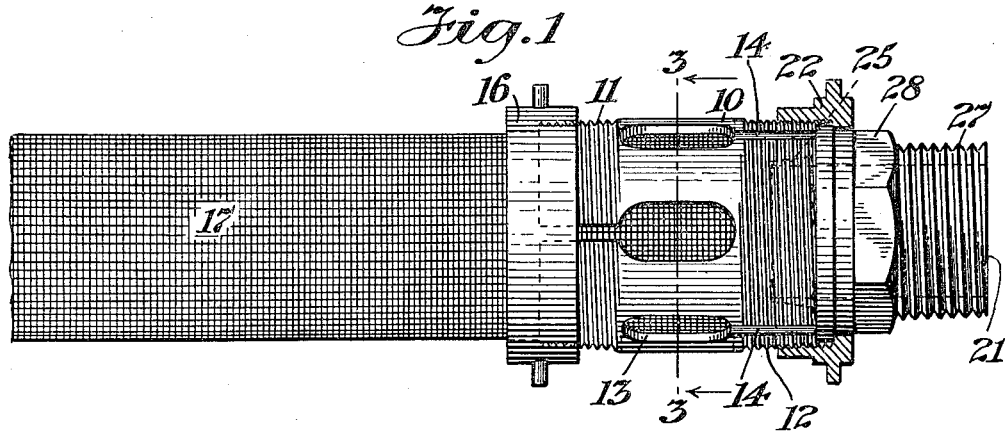
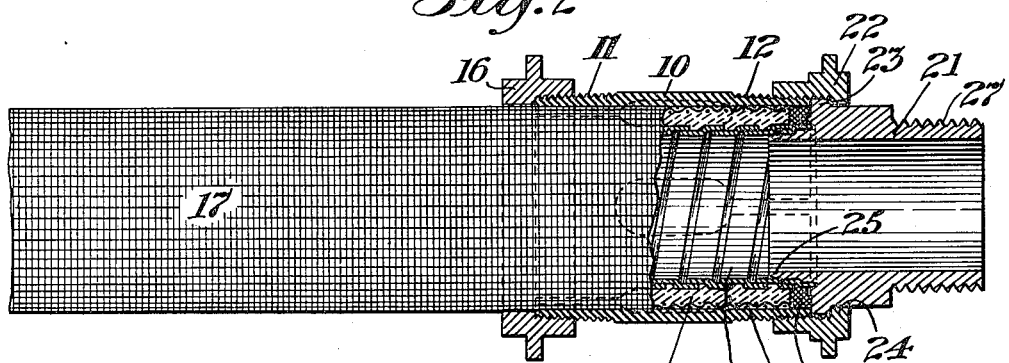
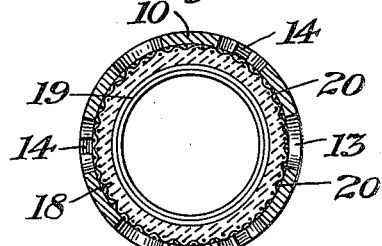
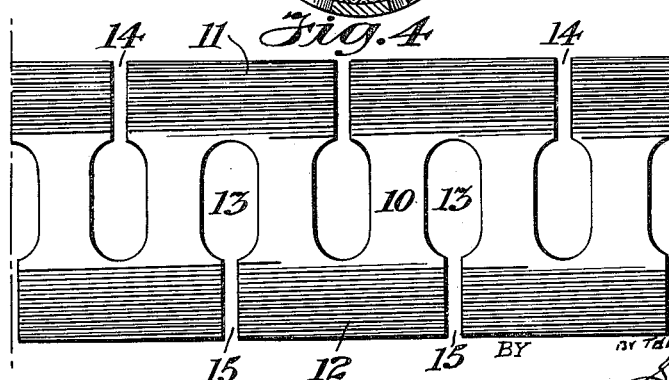
INVENTORS.
Henry J. Atticks
Henry H. Coussirat
BY THEIR ATTORNEYS Patented Mar. 11, 1924.

1,486,316

UNITED STATES PATENT OFFICE.

HENRY J. ATTICKS, OF NEW YORK, AND HENRY A. COUSSIRAT, OF BROOKLYN, NEW YORK.

COUPLING.

Application filed April 26, 1922. Serial No. 556,643.

*To all whom it may concern:*

Be it known that we, HENRY J. ATTICKS and HENRY A. COUSSIRAT, both citizens of the United States, residing, respectively, in the borough of Manhattan, city, county, and State of New York, and borough of Brooklyn, county of Kings, city and State of New York, have invented an Improvement in Couplings, of which the following is a specification.

This invention relates to a coupling and more particularly to that type of coupling adapted to be used in making joints in hose or connecting the hose to a pump, spigot, or other device. Heretofore in the use of hose lines employed for the transfer and delivery of gasoline and similar substances, difficulty has been experienced in the use of couplings because, due to the nature of this material, it has been substantially impossible to make a tight joint in the coupling. The object of our invention is to overcome this difficulty and in so doing we employ a coupling so constructed as to adequately grip the body of the hose and also to so compress the gasket employed as to insure a tight joint between the parts. To this end the construction is such that the gasket is preferably compressed both longitudinally of the hose and coupling as is customary and also transversely thereof as will be hereinafter more particularly described.

In the drawing:

Fig. 1 is an elevation and partial longitudinal section illustrating the coupling made in accordance with our invention.

Fig. 2 is a similar view showing the body of the coupling in section.

Fig. 3 is a section on line 3—3, Fig. 1, and

Fig. 4 is a plan of the body or band forming part of the coupling, showing the same in a flat or projected position.

Referring to the drawing in carrying out this invention, we employ a band 10 made of a suitable metal and having the opposite ends thereof slightly tapered and screw threaded as indicated at 11 and 12 respectively. In spaced positions this band is provided with openings 13, and in the band at one end thereof there are slots 14 extending from the edge of the band to alternate openings 13, while similarly at the other end of the band there are slots 15 extending between the edge of the band and the intermediate openings. This band is adapted to fit over one end of a hose, and one end of the band is fitted with a nut 16. The nut 16 is first passed over the hose which is indicated at 17 and then the band is passed over the hose and the end 11 thereof is adapted to be engaged by the nut 16, whereby in view of the taper on the end 11 of the band the divided portions of this end of the band will be clamped to the body of the hose.

In illustrating the invention we have shown a typical construction of metal lined hose, the body or foundation of which may be made of suitable material and is indicated at 18 having the metal lining 19 within and a suitable covering of duck or other similar material on the outside which is indicated at 20.

The coupling made in accordance with our invention also includes a shank member indicated at 21 and a nut 22 similar to the nut 16. The shank is provided with a flange 23 and the nut with a flange 24, these flanges being adapted to engage one another to permit a relative revoluble movement between the parts to which they are connected. The shank 21 is also provided with a tapered end 25 adapted to fit at its extremity within the end of the metal lining of the hose.

We also employ a gasket or washer 26 made of leather or any similar and suitable material and of such a diameter as to fit snugly within the end 12 of the band and between the same and the end of the metal lining 19.

In the use of the coupling the extremity of the body of the hose is made to abut against the gasket 26 and by drawing up the nut 22 on the tapered end 12 of the band the gasket will be compressed longitudinally between the adjacent face of the nut 21 and the end of the body of the hose, and the gasket will also be compressed transversely of the coupling by means of the tapered end 25 of the shank member forcing the metal lining outwardly and between the same and the inner surface of the adjacent end of the band. In order to make a tight joint when the parts are thus connected, the nut 22, as will be understood, is turned down on the screw threaded tapered end 12 of the band.

As illustrated the outer surface of the shank member 21 may also be screw threaded as indicated at 27 in order to be connected to a suitable nipple or other connection for securing the same to any device or apparatus to or from which liquid is to be supplied or withdrawn through the hose with which the coupling is connected. Still furthermore the portion 28 of the shank member 21 may have flattened sides to form a hexagon nut or otherwise in order to assist by the use of suitable tools in connecting the parts. It will furthermore be observed that in drawing up the nuts 16 and 22 on the band member the edges defining the openings 13 in the band member will be caused to grip or engage the body of the hose in such a manner as to securely connect the same thereto, and the shank member 21 may have a groove 29 in the face thereof into which there is a tendency to force a portion of the washer to further insure the joint of the coupling being made tight.

We claim as our invention:

1. A hose coupling comprising a band having a compressible end portion, a clamp nut on the compressible end portion of the band, and a shank having a portion extending into the hose, the clamp nut cooperating with the shank and the compressible end of the band to compress a gasket between this end of the band and that portion of the shank which extends into the hose.

2. A hose coupling comprising a band having a compressible end portion, a clamp nut on the compressible end portion of the band, and a shank member having a portion extending into the hose and adapted to engage an inner lining thereof, the said clamp nut coacting with the shank and the compressible end of the band to compress a gasket between the end portion of the band and that portion of the lining of the hose engaged by the extended portion of the shank.

3. A hose coupling comprising a band adapted to surround an end portion of a hose and having spaced longitudinal slits therein extending from one end of the band a predetermined distance toward the other end thereof, a clamp nut on the slitted end of the band, and a shank member cooperating with the said clamp nut and having an inner extension adapted to engage the inner portion of the hose at the end thereof whereby a gasket lying within the end of the band and between the same and the said inward extension of the shank member is compressed.

4. A hose coupling comprising a band adapted to surround the hose and having spaced openings therein and slots extending between the said openings and one end of the band to make the end portion thereof compressible, a nut on the slotted end of the band, and a shank coacting with the said nut and having a tapered extremity adapted to engage the lining of the hose and to compress a gasket transversely of the coupling between the same and a portion of the said band.

5. A hose coupling comprising a band having spaced openings therein and slots extending between alternate openings and opposite ends of the band, a nut on one end of the band, a nut on the opposite end of the band, and a shank member connected to and cooperating with the last aforesaid nut to compress a gasket lying between the end of the band and a portion of the said shank both transversely and longitudinally of the coupling.

6. A hose coupling comprising a band having spaced openings therein and slots extending between alternate openings and opposite ends of the said band, a nut on one end of the band, a nut on the opposite end of the band, and a shank member coacting with the last aforesaid nut and having a tapered extremity adapted to engage the lining of the hose and to compress a gasket transversely of the coupling between the same and a portion of the said band.

7. A hose coupling comprising a band having spaced openings therein and slots extending between alternate openings and opposite ends of the said band, a nut on one end of the band, a nut on the opposite end of the band, a shank member cooperating with the last aforesaid nut, and a tapered end at the extremity of the shank member adapted to engage the metal lining of the hose and to compress a gasket transversely of the coupling between the end of the hose lining and a portion of the said band, the gasket also being compressed longitudinally of the coupling between the end of the hose and the adjacent face portion of the said shank member.

8. A hose coupling comprising a band adapted to surround a portion of a hose, a clamp nut engaging the end of the band, a shank member cooperating with the said clamp nut, and a tapering end at the extremity of the shank member adapted to engage the lining of the hose to force the same against a gasket to compress the gasket transversely of the coupling between the lining of the hose and a part of the said band.

9. A hose coupling comprising a band adapted to surround a portion of the hose and having tapered screw threaded ends, a clamp nut adapted to engage one tapered end of the band member, a clamp nut adapted to engage the other end of the band member, a shank member engaging with the last aforesaid clamp nut, and means associated with the shank member for engaging and compressing a gasket both transversely and longitudinally of the coupling and the hose in which the same is connected.

10. A hose coupling comprising a band adapted to surround a portion of the hose and having tapered screw threaded ends, a clamp nut adapted to engage one tapered end of the band member, a shank member engaging with the last aforesaid clamp nut, and a tapered end at the extremity of the shank member adapted to engage the lining of the hose to force the same against a gasket which is thereby compressed transversely of the hose between the hose lining and a portion of the band, the gasket being also compressed longitudinally of the coupling between the end of the hose and the adjacent face of the shank member.

Signed by us this 9th day of March, 1922.

HENRY J. ATTICKS.
HENRY A. COUSSIRAT.